(12) United States Patent
Day-McCray

(10) Patent No.: US 8,038,447 B1
(45) Date of Patent: Oct. 18, 2011

(54) THERAPEUTIC DOLLS

(76) Inventor: Patricia Day-McCray, Chicago, IL (US)

( * ) Notice: Subject to any disclaimer, the term of this patent is extended or adjusted under 35 U.S.C. 154(b) by 407 days.

(21) Appl. No.: 12/248,289

(22) Filed: Oct. 9, 2008

(51) Int. Cl.
*G09B 23/28* (2006.01)

(52) U.S. Cl. ............................................. 434/267

(58) Field of Classification Search .......... 434/262, 434/267, 272, 274; 446/295, 296
See application file for complete search history.

(56) References Cited

U.S. PATENT DOCUMENTS

| | | | |
|---|---|---|---|
| 2,678,505 A | | 5/1954 | Munson |
| 2,959,891 A | * | 11/1960 | Barnett et al. ............... 446/295 |
| 4,288,222 A | * | 9/1981 | Kling ........................... 434/272 |
| 4,822,285 A | | 4/1989 | Summerville |
| D310,856 S | | 9/1990 | Pedersen |
| 5,232,369 A | * | 8/1993 | Mavrikis ...................... 434/262 |
| 5,295,694 A | | 3/1994 | Levin |
| 5,356,295 A | * | 10/1994 | Grosz ........................... 434/267 |
| 5,411,437 A | * | 5/1995 | Weber et al. ................. 434/269 |
| 6,159,017 A | | 12/2000 | Coomansingh |
| D482,415 S | * | 11/2003 | Svendsen ..................... D21/649 |
| 7,083,419 B2 | * | 8/2006 | Winslow ...................... 434/273 |
| 7,284,986 B2 | * | 10/2007 | Winnike et al. .............. 434/267 |
| D607,937 S | * | 1/2010 | Ulendeeva .................... D19/62 |

* cited by examiner

*Primary Examiner* — Kurt Fernstrom
(74) *Attorney, Agent, or Firm* — Kyle Fletcher

(57) ABSTRACT

The invention is an improved anatomical doll that has a clear tummy and back that swivel open to reveal either removable or non-removable organs. The removable organs are held in place by indentations in the abdomen of the doll, whereas each of the non-removable organs has an individual recess that allows the non-removable organ to be hidden further within the abdomen. An alternative embodiment of the invention is to provide a doll with missing limbs and corresponding prosthetic limbs. The primary benefit of the improved anatomical dolls is to provide a means to educate small children about the human anatomy, especially children that need an upcoming surgical procedure explained to them.

13 Claims, 6 Drawing Sheets

THERAPEUTIC DOLLS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of dolls, more specifically, dolls that illustrate the various organs and missing limbs with corresponding prosthetics.

Children undergo various medical procedures everyday, which requires special attention in explaining the upcoming procedure to the child. In light of this sensitive time, there is a need for a doll that can illustrate the various internal organs or limbs that may be impacted by the upcoming procedure. An additional use of said doll would be to provide a basic lesson in Anatomy to children.

B. Discussion of the Prior Art

As a preliminary note, it should be stated that there is an ample amount of prior art that deals with dolls. As will be discussed immediately below, no prior art discloses a children.

The Coomansingh Patent (U.S. Pat. No. 6,159,017) discloses a doll with preprogrammed auditory internal organs for a useful tool of teaching children about the human body. However, the doll disclosed under the Coomansingh Patent does not have organs that are either removable or non-removable, nor does the doll feature missing limbs with corresponding prosthetics.

The Levin Patent (U.S. Pat. No. 5,295,694) discloses a game and method of playing said game to simulate a minimally invasive surgical procedure. However, the game disclosed under the Levin Patent does not utilize a doll with a clear tummy and back that open to expose either removable or non-removable organs, and/or missing limbs with corresponding prosthetics.

The Summerville Patent (U.S. Pat. No. 4,822,285) discloses a toy doll with internal organs. However, the toy doll disclosed under the Summerville Patent resembles a cat, as opposed to a human. Furthermore, the toy doll does not have missing limbs with corresponding prosthetics, or organs that may be non-removable.

The Mavrikis Patent (U.S. Pat. No. 5,232,369) discloses a handicapped doll having a removable hair piece and missing limbs with corresponding prosthetics. However, the handicapped doll disclosed under the Mavrikis Patent does not have a clear tummy or back that reveal organs that may either be removed or pushed further into the abdomen via a recess that hides the organ.

The Munson Patent (U.S. Pat. No. 2,678,505) discloses a toy doll for simulating surgery. However, the toy doll disclosed under the Munson Patent does not have a clear tummy and back, and the abdomen does not have indentations to hold the removable organs or non-removable organs that have recesses to hide said non-removable organ.

The Pedersen Patent (U.S. Pat. No. Des. 310,856) illustrates a design for an anatomically correct doll, which does not have a clear tummy and back, removable or non-removable organs, and/or missing limbs with corresponding prosthetics.

The Anatomical dolls by The Feelings Company, Inc., are an example of non-patent prior art, which does not have a clear tummy and back, removable or non-removable organs, or missing limbs with corresponding prosthetics.

While the above-described devices fulfill their respective and particular objects and requirements, they do not describe a therapeutic doll that provides for the advantages of the therapeutic doll. In this regard, the therapeutic doll departs from the conventional concepts and designs of the prior art.

SUMMARY OF THE INVENTION

In light of the above discussed prior art there is a need for a doll having a clear tummy and clear back that opens to reveal all of the internal organs in the abdomen, which are either removable and held in place by indentations in the abdomen of the doll or are non-removable and have recesses that enable the organs to be hidden.

Thus, the invention is an improved anatomical doll that has a clear tummy and back that swivel open to reveal either removable or non-removable organs.

To accomplish the invention, the torso of the doll is made of hollowed construction, which provides the needed space to accommodate the structure for supporting the organs, whether removable or not.

The general purpose of the improved anatomical dolls is to provide a means to educate small children about the human anatomy, especially children that need an upcoming surgical procedure explained to them with a doll containing novel features that are not anticipated, rendered obvious, suggested, or even implied by any of the prior art, either alone or in any combination thereof.

It is a further object of the invention to provide a doll that educates a child of an upcoming injury, surgery, or to explain an injury of a wounded adult prior to their arrival, such as a returning veteran.

It is another object of the present invention to provide an anatomical doll that may be easily and efficiently manufactured and marketed.

It is another object of the present invention to provide an anatomical doll that may be made of durable and reliable construction.

Another object of the present invention to provide an anatomical doll that may include advantages of the prior art, while overcoming some of the disadvantages normally associated therewith.

These together with additional objects, features and advantages of the therapeutic doll will be readily apparent to those of ordinary skill in the art upon reading the following detailed description of presently preferred, but nonetheless illustrative, embodiments of the therapeutic doll when taken in conjunction with the accompanying drawings.

In this respect, before explaining the current embodiments of the therapeutic doll in detail, it is to be understood that the therapeutic doll is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the therapeutic doll. It is therefore important that the claims be regarded as including such equivalent construction insofar as they do not depart from the spirit and scope of the therapeutic doll. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
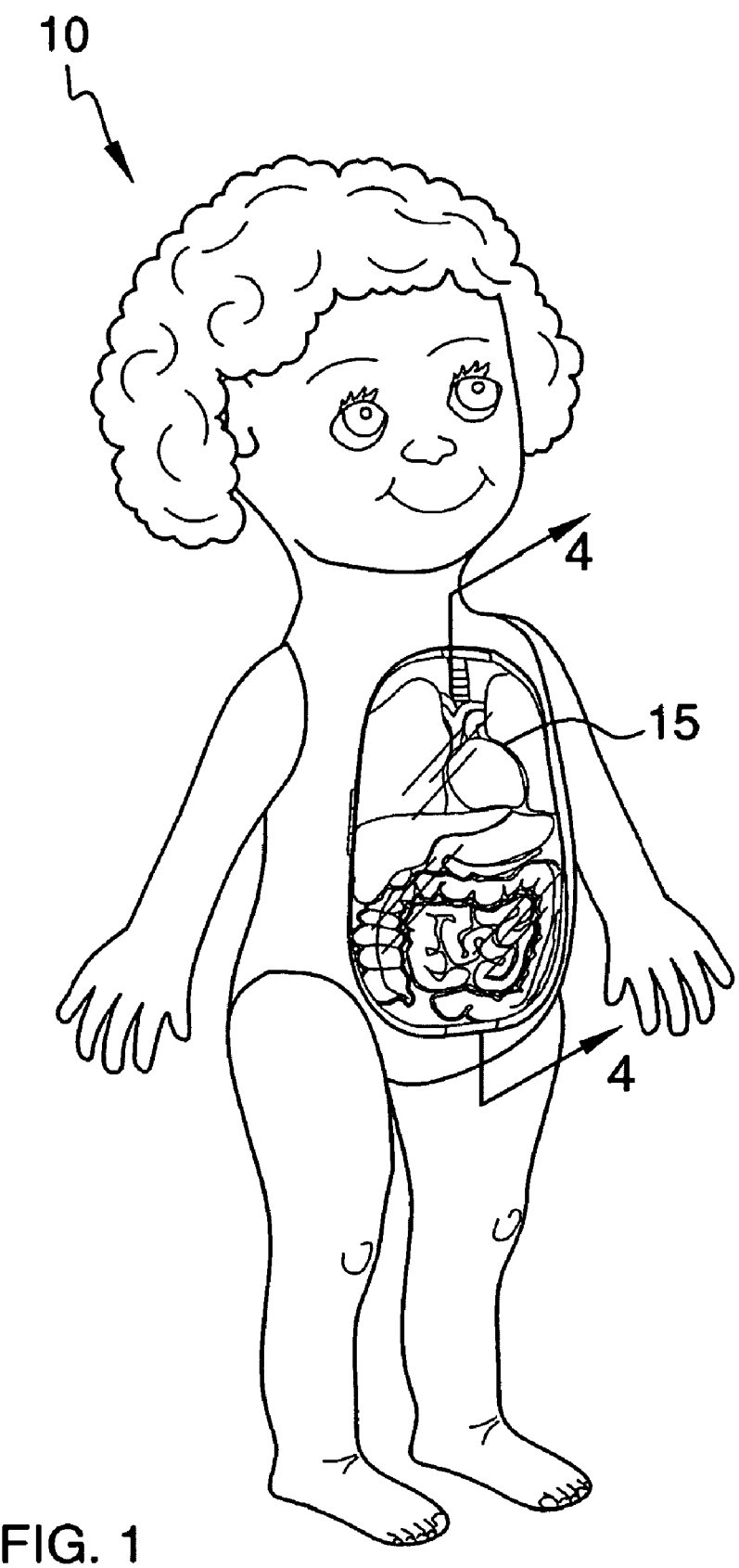
FIG. 1 illustrates an isometric view of a therapeutic doll having non-removable organs.
Figure 2:
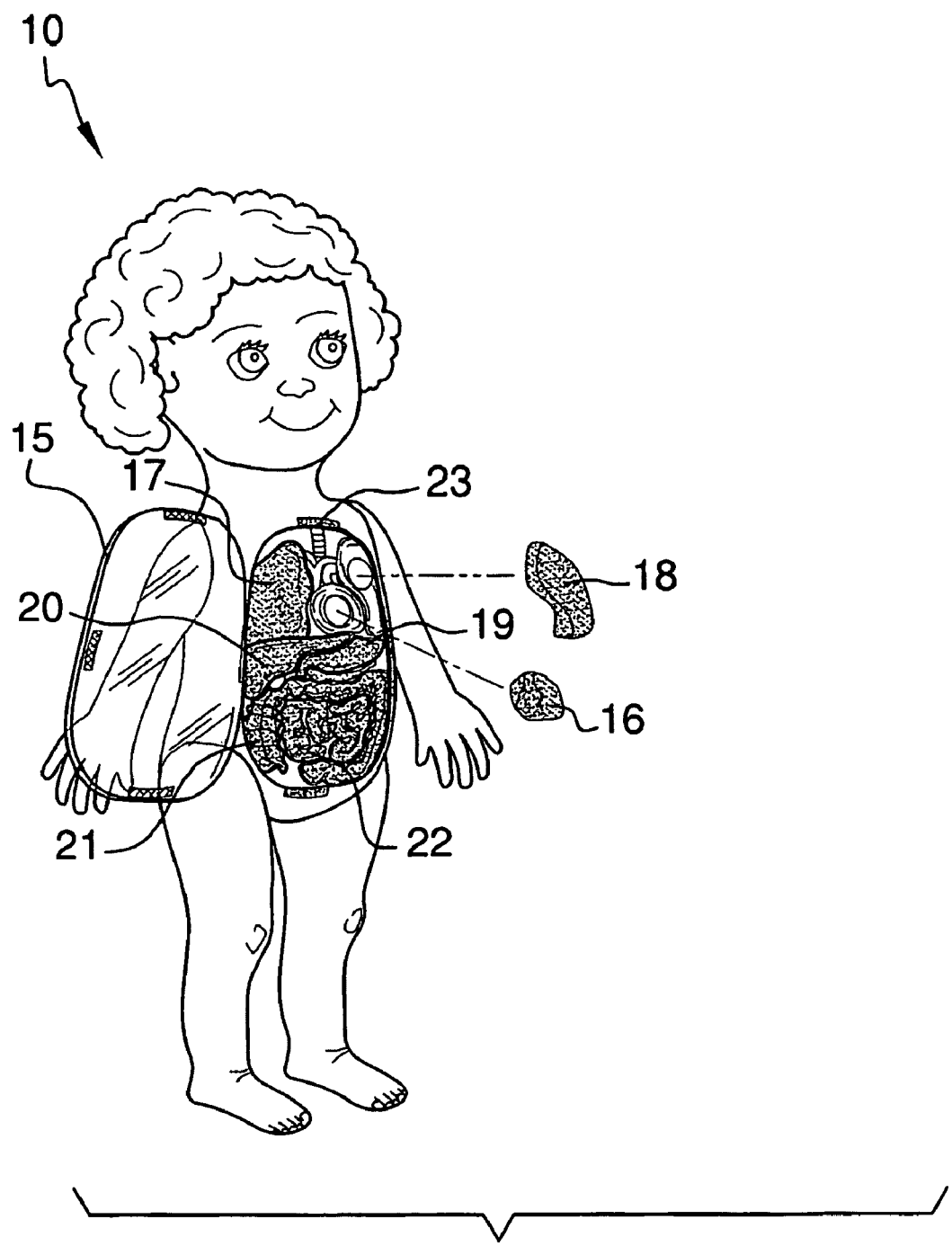
FIG. 2 illustrates an exploded view of the therapeutic doll, detailing the clear tummy open, removable organs, and indentations in the abdomen.
Figure 3:
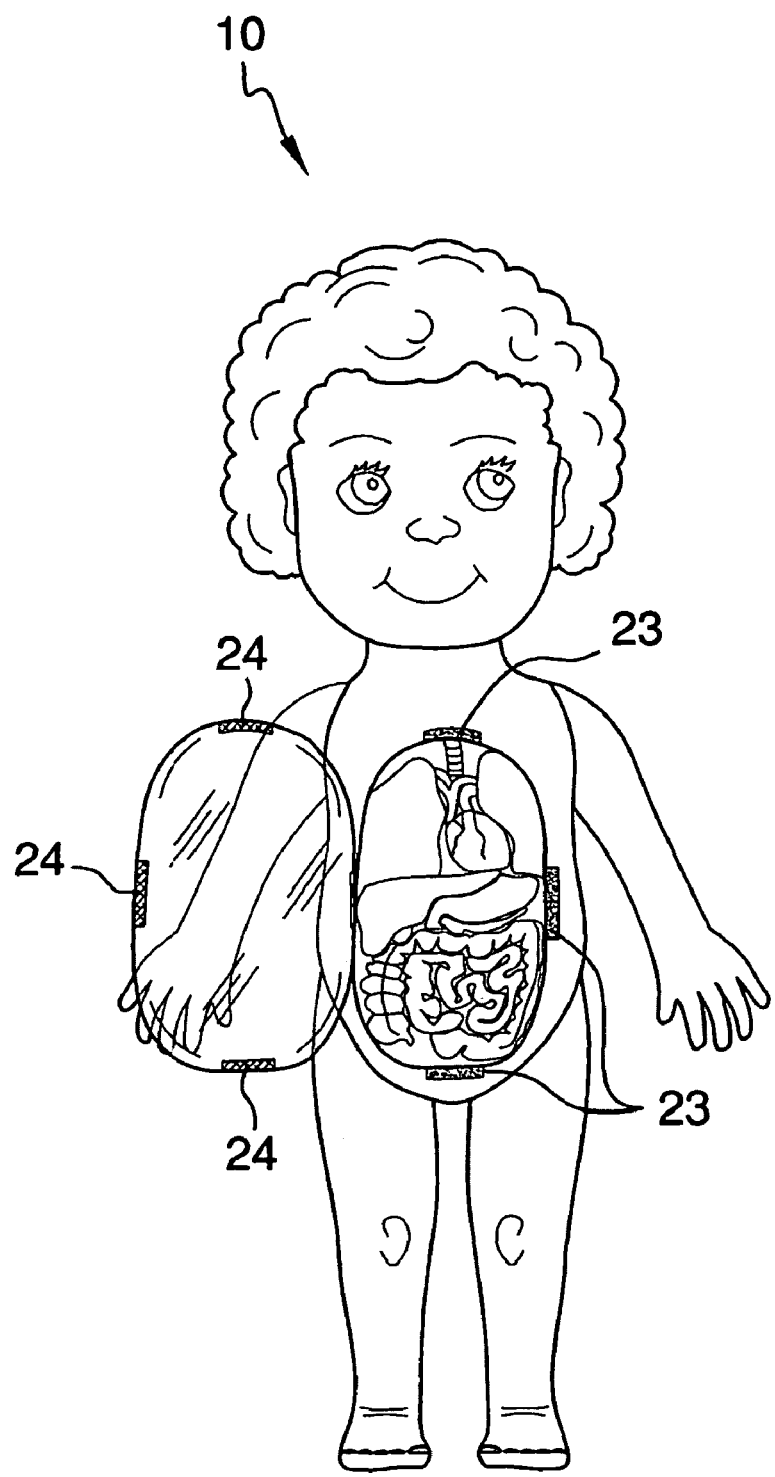
FIG. 3 illustrates a front view of the therapeutic doll with the clear tummy open, and the organs located in the appropriate locations.
Figure 4:
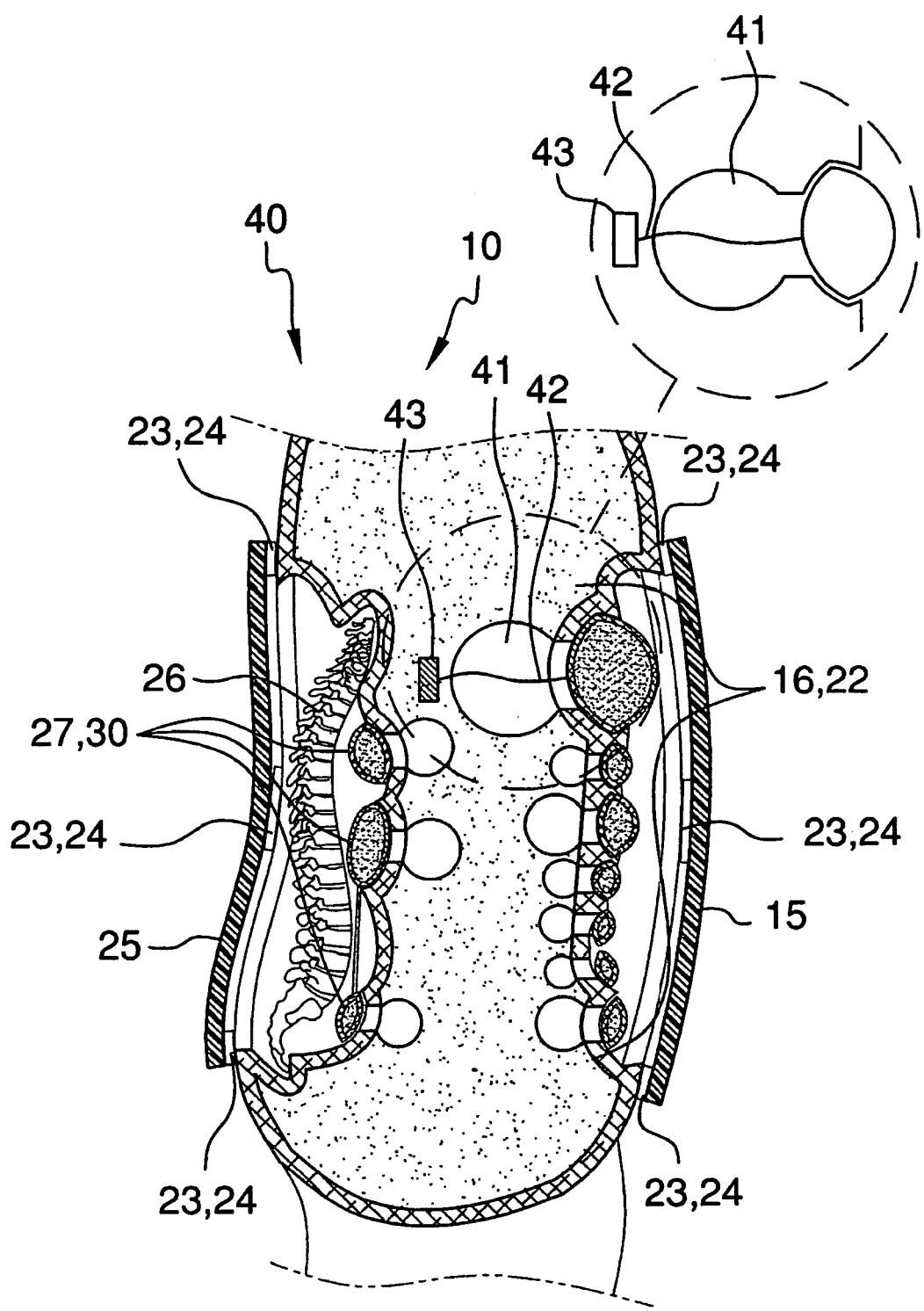
FIG. 4 illustrates a cross-sectional view of the abdomen of the therapeutic doll along line 4-4 in FIG. 1 detailing the internal recesses for each of the non-removable organs.

Detailed reference will now be made to the preferred embodiments of the present invention, examples of which are illustrated in FIGS. 1-3 and 6. A therapeutic doll 10 having a clear tummy 15, a removable heart 16, a removable left lung 17, a removable right lung 18, a removable stomach 19, a removable diaphragm 20, a removable upper intestine 21, a removable lower intestine 22.

Located along the perimeter of the opening of the abdomen of the doll 10 is a plurality of nylon hook strips 23. Located at corresponding locations along the interior surface of the tummy 15 is a plurality of nylon loop strips 24. The tummy 15 is attached to the doll 10 by a hinge 15A, which enables the tummy 15 to swing open to reveal the organs located therein.

Located within the abdomen of the doll 10 is a plurality of indentations designed to hold the respective organs, mentioned above, in the appropriate location within the abdomen of the doll.

Located on the back side of the doll 10 is a clear, back 25, that will enable access to a removable spine 26, a removable liver 27, a removable pancreas 28, a removable colon 29, a pair of removable kidneys 30, or other organs which are accessible from either the front or back side of the doll 10.

Located along the perimeter of the opening of the back of the doll 10 is a plurality of nylon hook strips 23. Located at corresponding locations along the interior surface of the back 25 is a plurality of nylon loop strips 24. The back 25 is attached to the doll 10 by a hinge 25A, which enables the back 25 to swing open to reveal the organs located therein.

Detailed reference will now be made to a non-removable organ embodiment 40, which is illustrated in FIGS. 1, 3, 4, and 6. The non-removable organ embodiment 40 features the same doll 10, tummy 15, back 25, and organs mentioned above, and an accompanying recess 41 for each of the above-mentioned organs. Each recess 41 is designed to provide a means of hiding the respective organ. It shall be noted that the spine 26 shall not be removable by virtue of the shape of the spine 26, itself with respect to the surrounding body cavity.

The organs 16-22 and 27-30, mentioned above, attach to the respective recess 41 by an attaching means, which comprises a string 42 that attaches along one end to the organ, and located at the opposite end of the string 42 is a stop 43 that is positioned in the body cavity that comprises the recess 41. The stop 43 insures that the respective organ does not remove itself from the non-removable organ embodiment 40. It shall be noted that the string 42 and the stop 43 are made of a strong material that, under normal circumstances, does not break.

The incorporation of the recess 41 provides a means of educating a child about each organ independent of the other organs, and can simplify the explanation of a complex surgery, if applicable.

Another principle reason for the non-removable organ embodiment 40 is safety. The fact that the organs are non-removable will prevent the organs from becoming a choking hazard and will also insure that the organs are not lost, resulting in an added expense for replacements.

It is further asserted that the doll 10 could also incorporate into the design, a removable skull (not shown), which, would enable access to either a removable or non-removable brain (not shown).

The tummy 15, the back 25, and all of the above-mentioned removable organs shall be made of a durable plastic or durable rubber.

Figure 5:
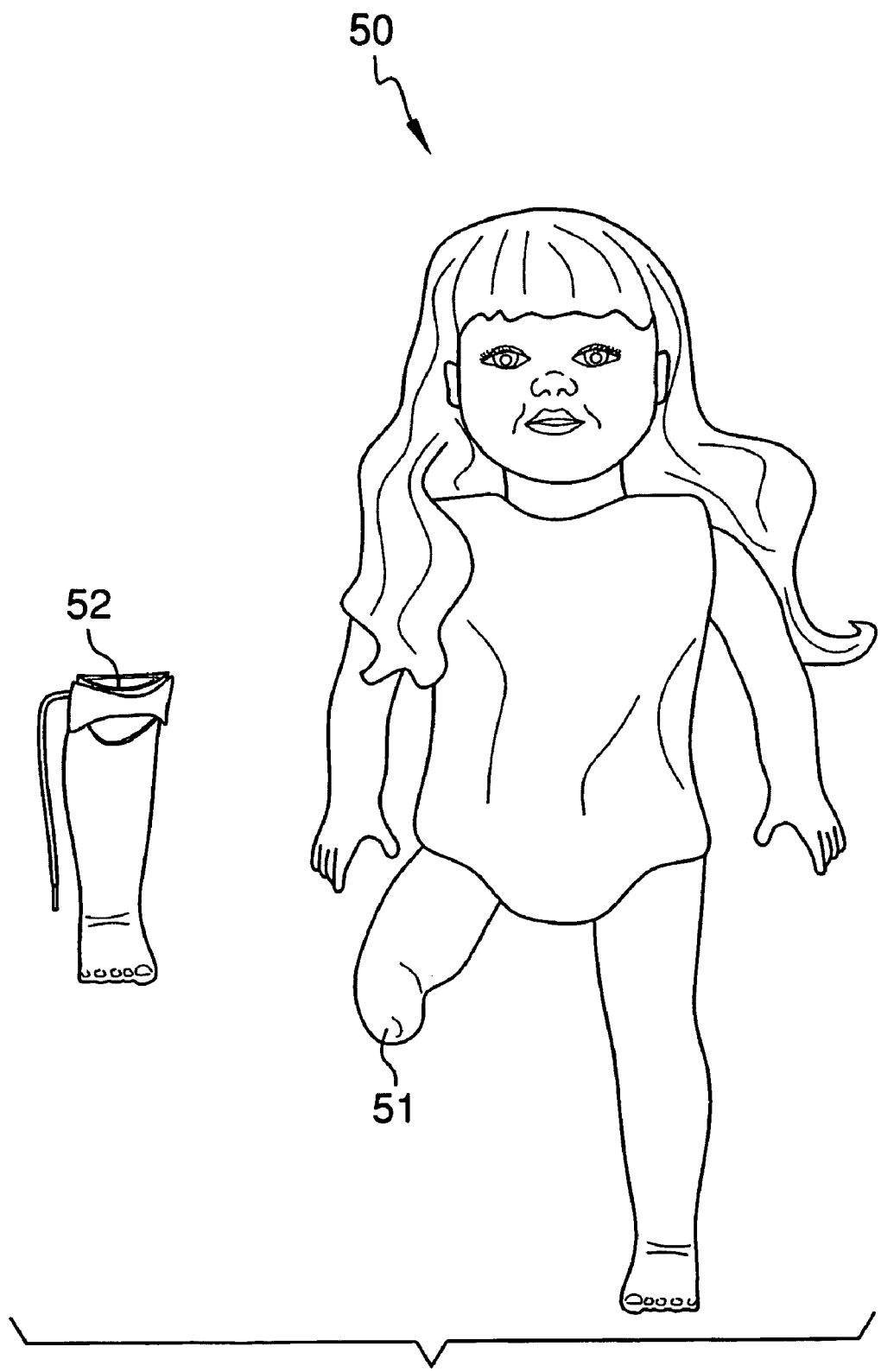
FIG. 5 illustrates the alternative embodiment having a missing limb with a prosthetic leg.
Figure 6:
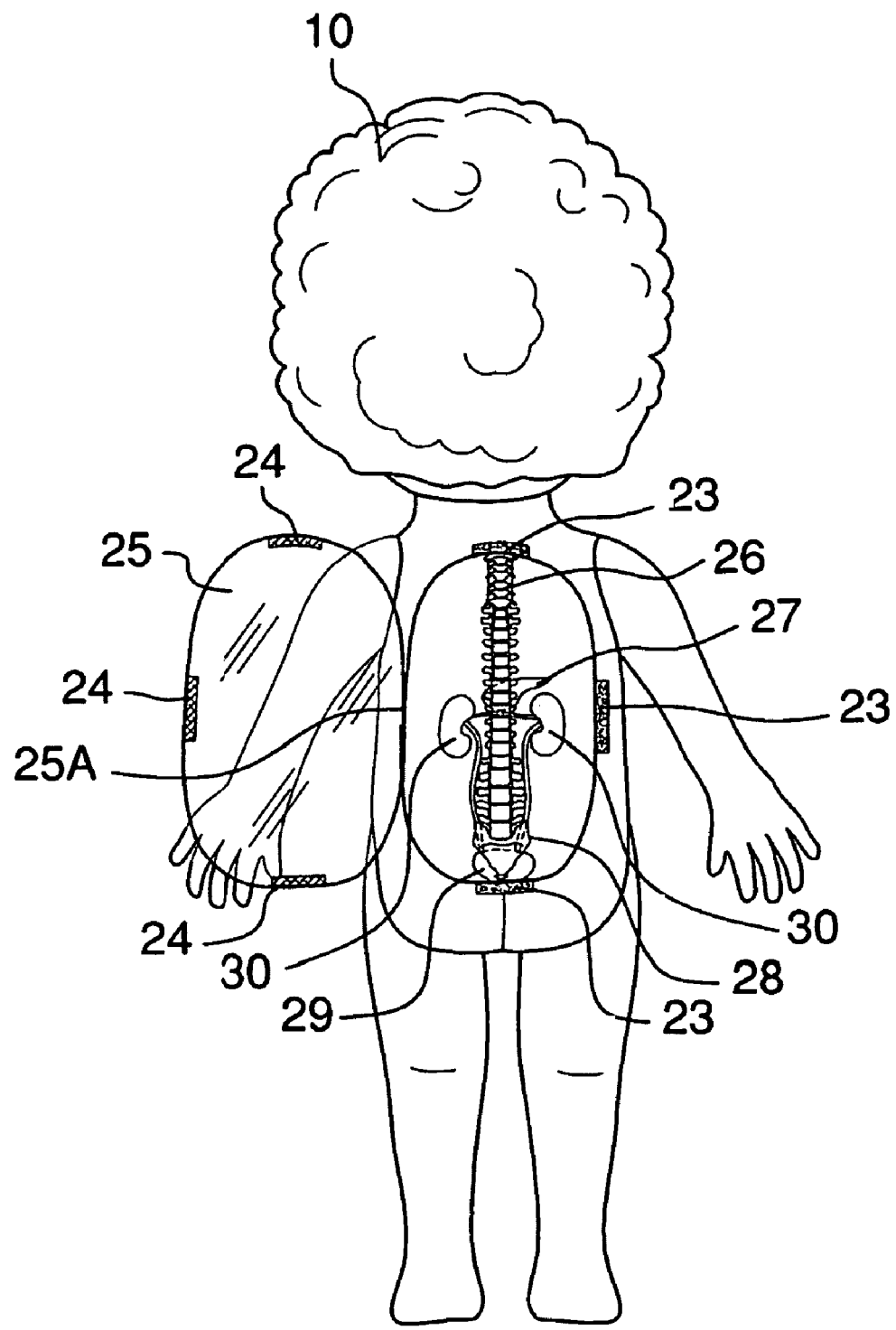
FIG. 6 illustrates a rear view of the therapeutic doll with the back open show-casing the non-removable organs that are located along the back.

Detailed reference shall now be made to a third embodiment that is illustrated in FIG. 5. A doll 50 includes a missing lower, left leg 51, and a corresponding prosthetic lower, left leg 52. It shall be noted that a different limb or combinations of limbs may be missing and accompanied by a corresponding prosthetic or prosthetics.

It shall be asserted that variations of the alternative embodiment of the doll 30 could include multiple missing limbs, or other configurations of missing limbs with corresponding prosthetics.

It shall be additionally asserted that the doll 30 may have limbs customized to match the child or person physically.

It is being asserted that the primary benefit of the alternative embodiment is to provide an educational tool to a child who has or will have a missing limb, in order to teach about proper maintenance, care, and installation of a corresponding prosthetic limb that has or will be prepared for said child.

The prosthetic lower, left leg 52 shall be made of a durable plastic or a durable rubber.

It shall be noted that all embodiments shall be made of a safe, non-toxic material. That the various dolls, limbs, and/or organs may be made of a material that is clear or of a color analogous to the organ or of a skin tone of a variety of ethnicities.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A therapeutic doll with removable organs comprising:
   (a) a tummy;
      wherein the tummy opens up to reveal the internal organs located in a front opening;

(b) a back;
  wherein the back opens up to reveal the internal organs located in a back opening;
  wherein the internal organs are removable and include a heart, lungs, stomach, diaphragm, upper and lower intestine, spine, kidneys, liver, pancreas, and colon;
  wherein located within the front opening and the rear opening of the doll is a plurality of indentations each of which is anatomically positioned and designed to hold the respective organs.

2. The therapeutic doll with removable organs as described in claim 1 wherein the removable organs, tummy, and back are made of a durable plastic.

3. The therapeutic doll with removable organs as described in claim 1 wherein the removable organs, tummy, and back are made of a durable rubber.

4. The therapeutic doll with removable organs as described in claim 1 wherein the tummy is clear, hingedly attached along one side, and
  wherein located along the perimeter of the front opening is a plurality of nylon hook strips;
  wherein located at corresponding locations along the interior surface of the tummy is a plurality of nylon loop strips.

5. The therapeutic doll with removable organs as described in claim 1 wherein the back is clear, hingedly attached along one side, and
  wherein located along the perimeter of the back opening is a plurality of nylon hook strips;
  wherein located at corresponding locations along the interior surface of the back is a plurality of nylon loop strips.

6. The therapeutic doll with removable organs as described in claim 1 wherein a hingedly attached skull opens to reveal a removable brain that fits within an indentation located in the base of the head of the doll.

7. A therapeutic doll with non-removable organs comprising:
  (a) a tummy;
    wherein the tummy opens up to reveal the internal organs located in a front opening;
  (b) a back;
    wherein the back opens up to reveal the internal organs located in a back opening;
  wherein the internal organs include a heart, lungs, stomach, diaphragm, upper and lower intestine, spine, kidneys, liver, pancreas, and colon;
  wherein located within the front opening and the rear opening of the doll is a plurality of recesses each of which is anatomically positioned and designed to enable the respective organ to be hidden when the organ is pushed inside of the recess; and
  wherein the organ and respective recess are secured together by a securing means so as to make the organ non-removable.

8. The therapeutic doll with non-removable organs as described in claim 7 wherein the organs, tummy, and back are made of a durable plastic.

9. The therapeutic doll with non-removable organs as described in claim 7 wherein the organs, tummy, and back are made of a durable rubber.

10. The therapeutic doll with non-removable organs as described in claim 7 wherein the tummy is clear, hingedly attached along one side, and
  wherein located along the perimeter of the front opening is a plurality of nylon hook strips;
  wherein located at corresponding locations along the interior surface of the tummy is a plurality of nylon loop strips.

11. The therapeutic doll with non-removable organs as described in claim 7 wherein the back is clear, hingedly attached along one side, and
  wherein located along the perimeter of the back opening is a plurality of nylon hook strips;
  wherein located at corresponding locations along the interior surface of the back is a plurality of nylon loop strips.

12. The therapeutic doll with non-removable organs as described in claim 7 wherein the securing means comprises a string that is attached at one end to the non-removable organ;
  wherein attached to the opposite end of the string is a stop, which is located on a side of the recess that is opposite of where the respective organ rests when pushed within said recess.

13. The therapeutic doll with non-removable organs as described in claim 7 wherein a hingedly attached skull opens to reveal a removable brain that fits within an indentation located in the base of the head of the doll.

\* \* \* \* \*